United States Patent
Lin

(10) Patent No.: US 7,613,191 B2
(45) Date of Patent: *Nov. 3, 2009

(54) PACKET TRANSMISSION METHOD OF WIRELESS NETWORK

(75) Inventor: Tzu-Ming Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 434 days.

This patent is subject to a terminal disclaimer.

(21) Appl. No.: 11/308,753

(22) Filed: Apr. 28, 2006

(65) Prior Publication Data

US 2007/0195769 A1 Aug. 23, 2007

(30) Foreign Application Priority Data

Feb. 23, 2006 (TW) ............................... 95106047 A

(51) Int. Cl.
H04L 12/28 (2006.01)
H04L 12/56 (2006.01)
H04H 1/00 (2006.01)

(52) U.S. Cl. ................. 370/394; 370/448; 370/447; 370/310; 370/277; 370/349; 455/503; 455/3.05; 455/517

(58) Field of Classification Search ................. 370/349, 370/447, 448, 248, 310, 277, 394
See application file for complete search history.

(56) References Cited

U.S. PATENT DOCUMENTS

| | | | | |
|---|---|---|---|---|
| 5,170,393 A | * | 12/1992 | Peterson et al. | 370/255 |
| 6,128,310 A | * | 10/2000 | Chow et al. | 370/448 |
| 7,107,359 B1 | * | 9/2006 | Burton et al. | 709/250 |
| 7,532,593 B2 | * | 5/2009 | Shirokura et al. | 370/328 |
| 2002/0071407 A1 | * | 6/2002 | Koo et al. | 370/335 |
| 2002/0163929 A1 | * | 11/2002 | Li et al. | 370/448 |
| 2005/0013307 A1 | * | 1/2005 | Park | 370/395.53 |
| 2005/0195750 A1 | * | 9/2005 | Le et al. | 370/252 |
| 2005/0237932 A1 | * | 10/2005 | Liu | 370/230 |
| 2006/0098662 A1 | * | 5/2006 | Gupta et al. | 370/401 |
| 2006/0215686 A1 | * | 9/2006 | Takeuchi | 370/445 |
| 2006/0245428 A1 | * | 11/2006 | Yanamoto et al. | 370/394 |
| 2006/0256792 A1 | * | 11/2006 | Kwong et al. | 370/394 |
| 2007/0171933 A1 | * | 7/2007 | Sammour et al. | 370/447 |

FOREIGN PATENT DOCUMENTS

CN 1384645 12/2002

OTHER PUBLICATIONS

"Solutions to Performance Problems in VoIP Over a 802.11 Wireless LAN" jointly authored by Wang, et al., IEEE Transactions on Vehicular Technology, p. 366-384, vol. 54, No. 1, Jan. 2005.
"1st Office Action of Chinese counterpart application", issued on Jul. 10, 2009, p. 1-p. 6.

* cited by examiner

Primary Examiner—Huy Q Phan
(74) Attorney, Agent, or Firm—Jianq Chyun IP Office

(57) ABSTRACT

A multicast packet transmitting method of wireless network is provided. According to the method, a first transmitting terminal adds a first acknowledge serial number into a multicast downlink packet and transmits the downlink packet to a second transmitting terminal. After transmitting the downlink packet, the first transmitting terminal determines whether to re-transmit the downlink packet in accordance to a received second acknowledge serial number in an uplink packet, which is output from the second transmitting terminal.

19 Claims, 12 Drawing Sheets

PACKET TRANSMISSION METHOD OF WIRELESS NETWORK

CROSS-REFERENCE TO RELATED APPLICATION

This application claims the priority benefit of Taiwan application serial no. 95106047, filed on Feb. 23, 2006. All disclosure of the Taiwan application is incorporated herein by reference.

BACKGROUND OF THE INVENTION

1. Field of Invention

The present invention relates to a packet transmitting method. More particularly, the present invention relates to a packet transmitting method of wireless network.

2. Description of Related Art

Recently, wireless networks, such as WLAN and WMAN, have been developed one after the other, and networks have been setup one by one to provide services. Wherein packet voice/video is regarded as one of the most important application service on wireless network system. However, the provision of real-time communication services on wireless network system experiences many challenges. For example, wireless hand-held devices usually use batteries as a power supply so that the power consumption problem has to be resolved. In addition, video and audio data of real-time communication system is usually timely generated as a small packet, which may greatly affect bandwidth utilization of wireless network system.

Most wireless network system are designed for transmitting data packets, but not optimized for the transmission of real-time packets. The characteristics of real-time communication packet are not fully utilized in the design of wireless network system, for example, usually real-time communication can tolerate packet loss to certain extent, and using additional bandwidth to achieve reliable transmission is not the most important consideration in audio packet transmission. Thus, increasing network bandwidth and reducing power consumption of handheld devices is able to facilitate the development of the real-time communication services of wireless network environment.

The operation flow of standard 802.11 is as shown in FIG. 1, when a mobile station (MS) transmits a packet, if the wireless media is used by other MS, the MS waits until the wireless media is free and then waits for a DCF interframe space (DIFS), then the MS begins to count down the contention window (CW). When the CW is counted down to 0, the MS starts to transmit control packets such as RTS (request transmission send), CTS (confirm transmission send) etc, or data packet and fragmentation packets (such as Frg#1 and Frg#2). After receiving the correct packet, a receiving terminal transmits an ACK packet to the transmitting terminal after a short interframe space (SIFS).

FIG. 2 is a system configuration diagram of a wireless network using real-time communication service. Referring to FIG. 2, in the wireless network, one or a plurality of wireless network devices 202 and 204 are connected to a cable network through wireless network AP (access point) 210 to access the Internet 230. For example, an uplink real-time frame is transmitted to a router 220 in local network through the wireless network AP 210, and then a router 220 transmits the packet to the other correspondent node 240 capable of real-time communication through the Internet 230. As to a downlink real-time frame, the packet is first transmitted to the router 220 through the Internet 230, and then the router 220 transmits the packet to the wireless network device 202 or 204 through the wireless network AP 210.

Presently, the simplest method for transmitting real-time packet through wireless network is turning on a network card all the time so that the network card can always receive packet. However, in such design, the network card still consumes power even when it does not receive packet. One solution to ameliorate power consumption is to turn on the wireless network to a sleeping mode, and the wireless network device is waken up when there is a packet to be transmitted. Such method is referred to as a PS-Poll transmission mechanism. FIG. 3 is a diagram illustrating the packet timing and the corresponding power consumption while transmitting real-time packet in wireless network with the PS-Poll transmission mechanism. Referring to FIG. 3, the wireless network device (STA) begins transmitting uplink and downlink real-time frames after performing the related connecting and registering actions. After the uplink real-time packet (UL Voice Packet) is transmitted, the wireless network device continues to wait for a response packet (ACK) of the wireless network AP because the wireless network device has to determine whether the packet needs to be re-transmitted. In addition, the downlink real-time packet (DL Voice Packet) stored in the buffer of the wireless network AP needs to be taken over through the PS-Poll because the wireless network device is in a power saving mode. Similarly, to allow the wireless network AP to determine whether to re-transmit the packet, the wireless network device has to transmit the response packet to the wireless network AP, so that the wireless network AP can confirm that the packet has been received successfully. Accordingly, to reliably transmit real-time packet, two short interframe spaces (SIFS) and two response packets are necessitated which may limit the improvement in power consumption and network-utilized bandwidth.

If unscheduled-automatic power saving delivery (U-APSD) mechanism defined in 802.11e is used for transmitting real-time packets, the power consumption of the PS-Poll transmission mechanism can be further reduced. FIG. 4 is a diagram illustrating packet timing and its corresponding power consumption while transmitting real-time packet in wireless network with the U-APSD mechanism. Compared with FIG. 3, FIG. 4 is similar to FIG. 3 except there is one PS-Poll packet fewer in FIG. 4, so the similar part isn't described again.

To achieve better power saving performance, many relative media control technologies have been further developed besides the foregoing power saving delivery. However, some of the power saving mechanisms may change the transmission mechanism of 802.11 and thus incompatible with the standard. Some of the power saving mechanisms are limited by the detection or the result of the estimation so may have different power saving performances. Moreover, some of the power saving mechanisms may consume more power in other portions while saving power in a particular portion and some other power saving mechanisms can cause other problems, such as reduced throughput or disconnection, to achieve power saving performance.

To avoid the aforementioned disadvantages, the inventor provided a technology for transmitting real-time communication packets in multicast manner. And this technology is proved to be efficient in reducing power consumption. However, the transmission of multicast packets does not perform packet acknowledgement in the standard specification; thus, there still needs improvement in ensuring communication quality.

In other words, all the works have been done so far to save the power have their own disadvantages, especially some power saving mechanisms may cause inconvenience in application due to their incompatibility with the standard. Thus, the existing technology cannot resolve the problems in real-time communication effectively.

SUMMARY OF THE INVENTION

Accordingly, the present invention is directed to provide a packet transmitting method of wireless network. According to the packet transmitting method, packets of real-time communication service are transmitted through the multicast mechanism defined in 802.11 standards. This method is compatible with the standard and not affected by the accuracy of estimation or detection, and furthermore, this method doesn't increase the power consumptions in other parts or affect the mobile devices in any other ways. Through the power saving technology of the present invention, the power consumption can be reduced, and utilized bandwidth of the entire network system is increased.

To achieve the aforementioned objectives, the present invention provides a multicast packet transmitting method of wireless network. According to the method, a first transmitting terminal adds a first acknowledge serial number into the multicast downlink packet, then transmits the downlink packet including the first acknowledge serial number to a second transmitting terminal. After transmitting the downlink packet, the first transmitting terminal determines whether to re-transmit the downlink packet according to a received second acknowledge serial number in an uplink packet, which is transmitted by the second transmitting terminal.

In an embodiment of the present invention, the second transmitting terminal obtains the packet serial number of the downlink packet after receiving the downlink packet, and uses it as the second acknowledge serial number, and then adds the second acknowledge serial number into the uplink packet and transmits the uplink packet including the second acknowledge serial number.

In an embodiment of the present invention, when the second acknowledge serial number is different from the packet serial number of the previous downlink packet, the first transmitting terminal re-transmits the subsequent scheduled downlink packets.

In an embodiment of the present invention, the first transmitting terminal transmits the downlink packets with a communication medium, and the second transmitting terminal transmits the uplink packets with a reverse link of the communication medium.

In an embodiment of the present invention, the first transmitting terminal further provides the number of collision in the downlink packet while transmitting the downlink packet, and the second transmitting terminal determines backoff time of the uplink packet according to the number of collision.

In summary, according to the present invention, the packet transmitting parameters are provided based on the data packets in the original communication protocol, so that the transmission quality of the multicast packets can be improved without increasing the burden of the network. In addition, the transmission of the number of collision directly provides the current status of whether the network environment is crowded, so that the backoff time provided accordingly can efficiently reduce the chances of packet collision.

To make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

WLAN will be described below, however, the content of the present invention is not limited to WLAN; instead but can be applied to various wireless network systems. Besides, even though only multicast real-time communication packet is explained in the embodiments, the technology of the present invention can also be applied to non real-time communication packet or other mechanism with transmission behavior similar to multicasting.

Figure 1:
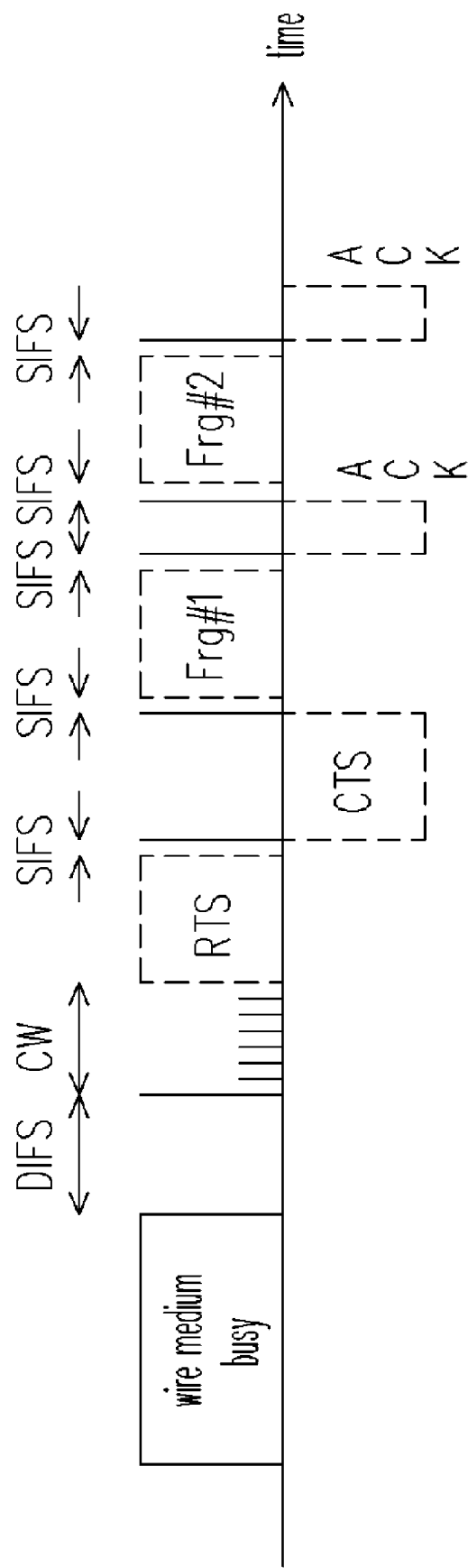
FIG. 1 is an operation flowchart of standard 802.11.
Figure 2:
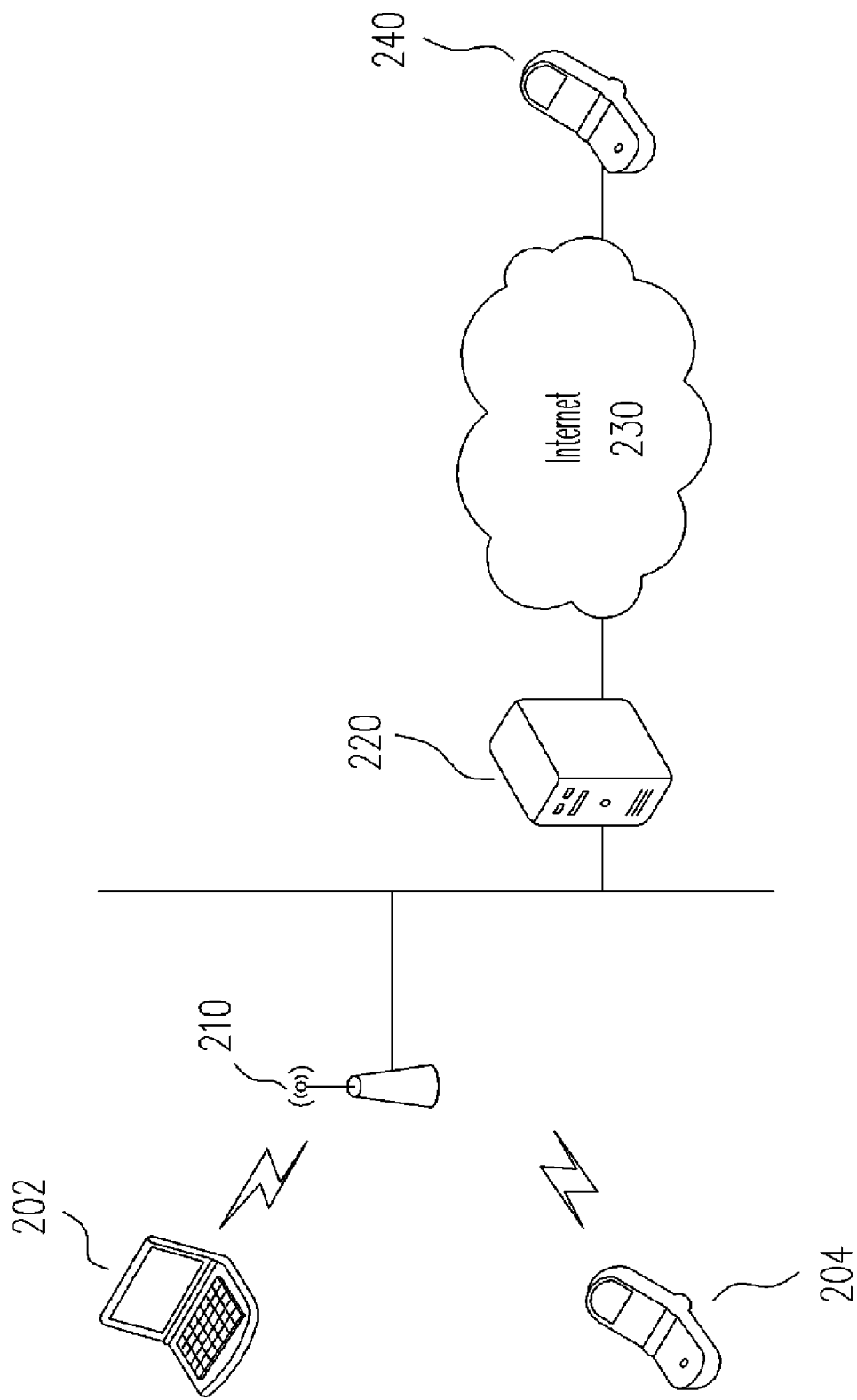
FIG. 2 is a system configuration diagram of a wireless network using real-time communication service.
Figure 3:
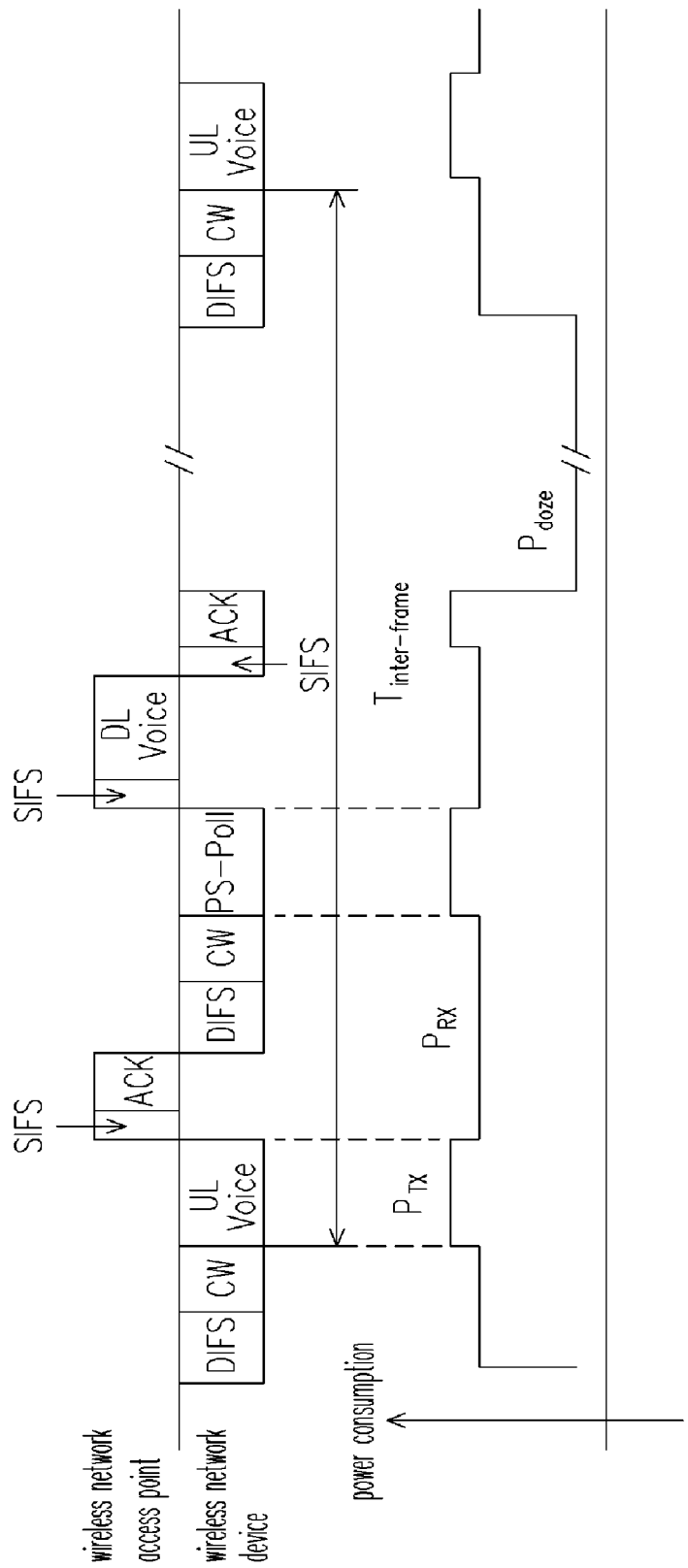
FIG. 3 is a diagram illustrating the packet timing and its corresponding power consumption while transmitting real-time packet in wireless network with PS-Poll mechanism.
Figure 4:
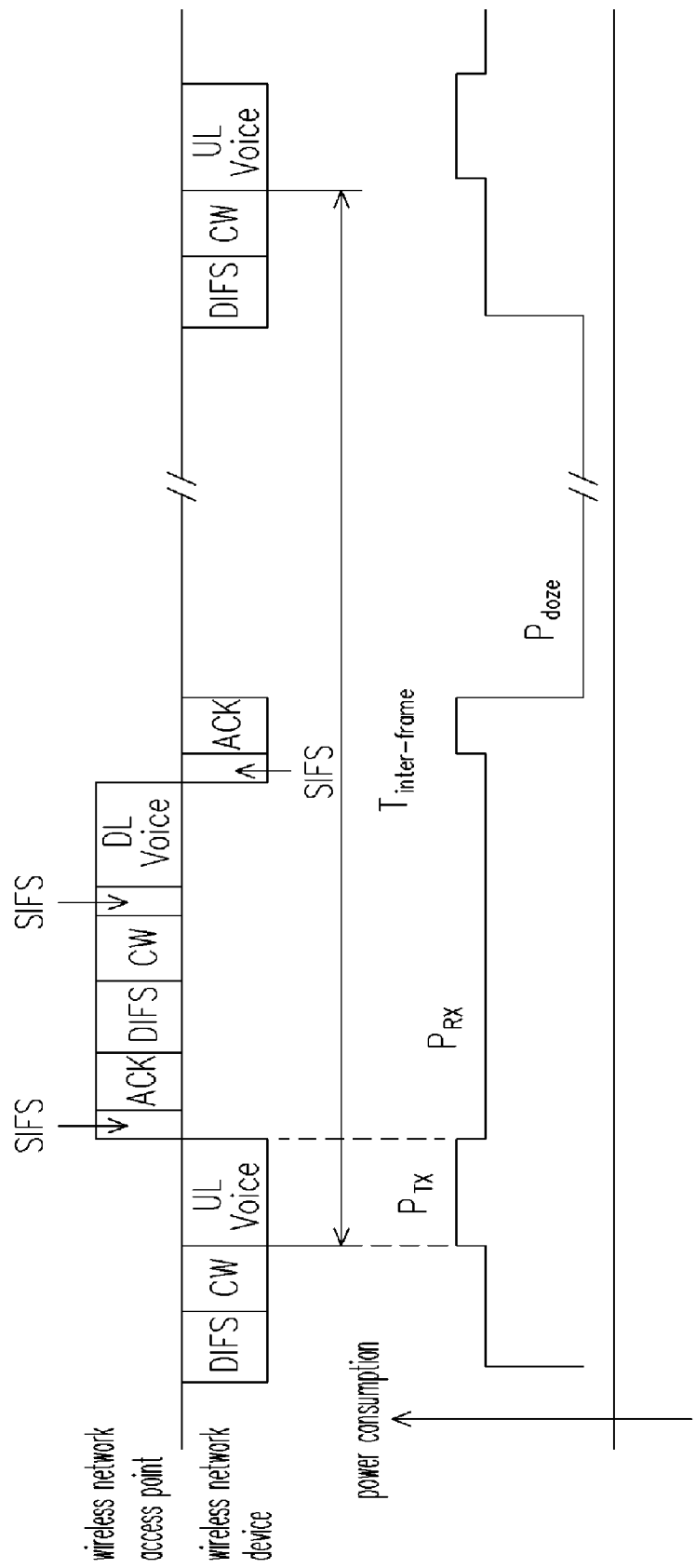
FIG. 4 is a diagram illustrating the packet timing and its corresponding power consumption while transmitting real-time packet in wireless network with U-APSD mechanism.
Figure 5:
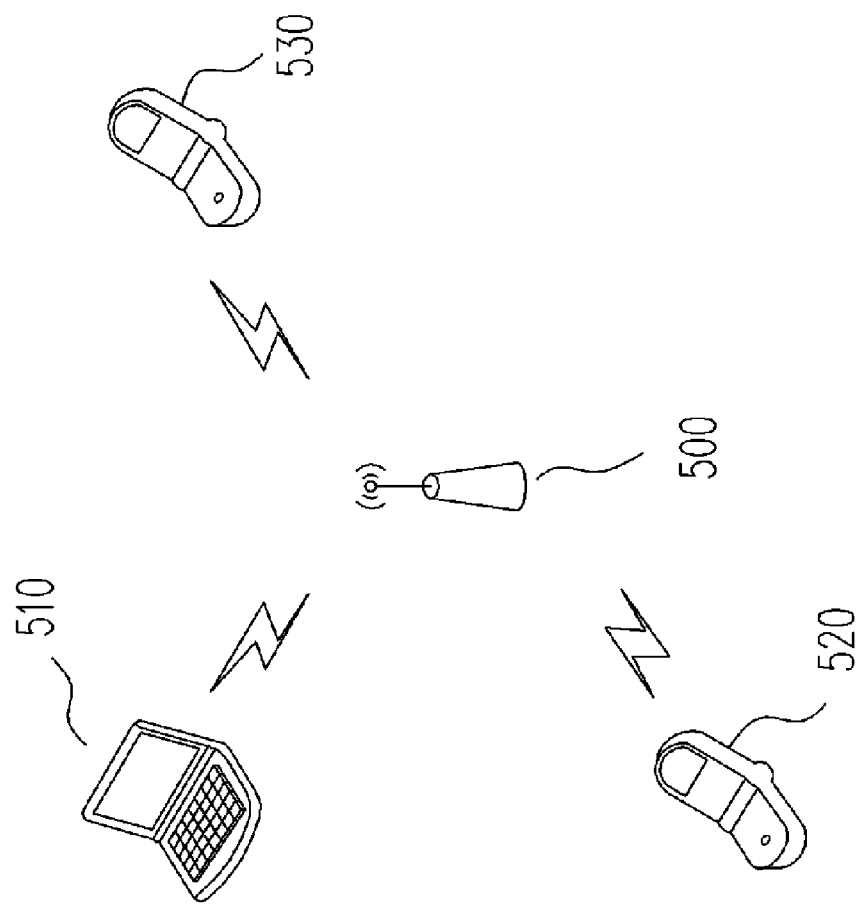
FIG. 5 is a system configuration diagram of a wireless network.

Referring to FIG. 5, it shows a system configuration diagram of a wireless network. In the wireless network system, the mobile stations (MS) 510, 520, or 530 communicate with other mobile stations by using wireless network access point (AP) 500 as a relay station for signals. For example, when the mobile station 510 is to exchange signal with the mobile station 530, first, the mobile station 510 transmits the signal to the wireless network AP 500, then the wireless network AP 500 transmits the signal to the mobile station 530. As to the mobile stations 510, 520, or 530, receiving signals from the wireless network AP 500 is referred to as downlink, and transmitting signals to the wireless network AP 500 is referred to as uplink.

According to wireless network communication standard, each packet (uplink or downlink) has a particular packet serial number for representing the generating sequence of the packet. In the present invention, both the purposes of power saving and improving the transmission reliability can be achieved through piggyback ACK manner using the packet serial number.

In an embodiment of the present invention, before transmitting a downlink packet (referred to as downlink packet thereinafter) in multicast manner, the wireless network AP adds a predefined acknowledge serial number (can be the received packet serial number of the uplink packet previously) into the downlink packet. After adding the acknowledgement serial number into the downlink packet, the wireless network AP transmits the downlink packet. Next, the wireless network AP determines whether to re-transmit the previously transmitted downlink packet according to the acknowledgement serial number in the packet (referred to as uplink packet thereinafter) transmitted from the destination of the downlink packet. This method for acknowledging packet transmission along with the uplink data packet is referred to as piggyback ACK in the present invention.

Figure 6:
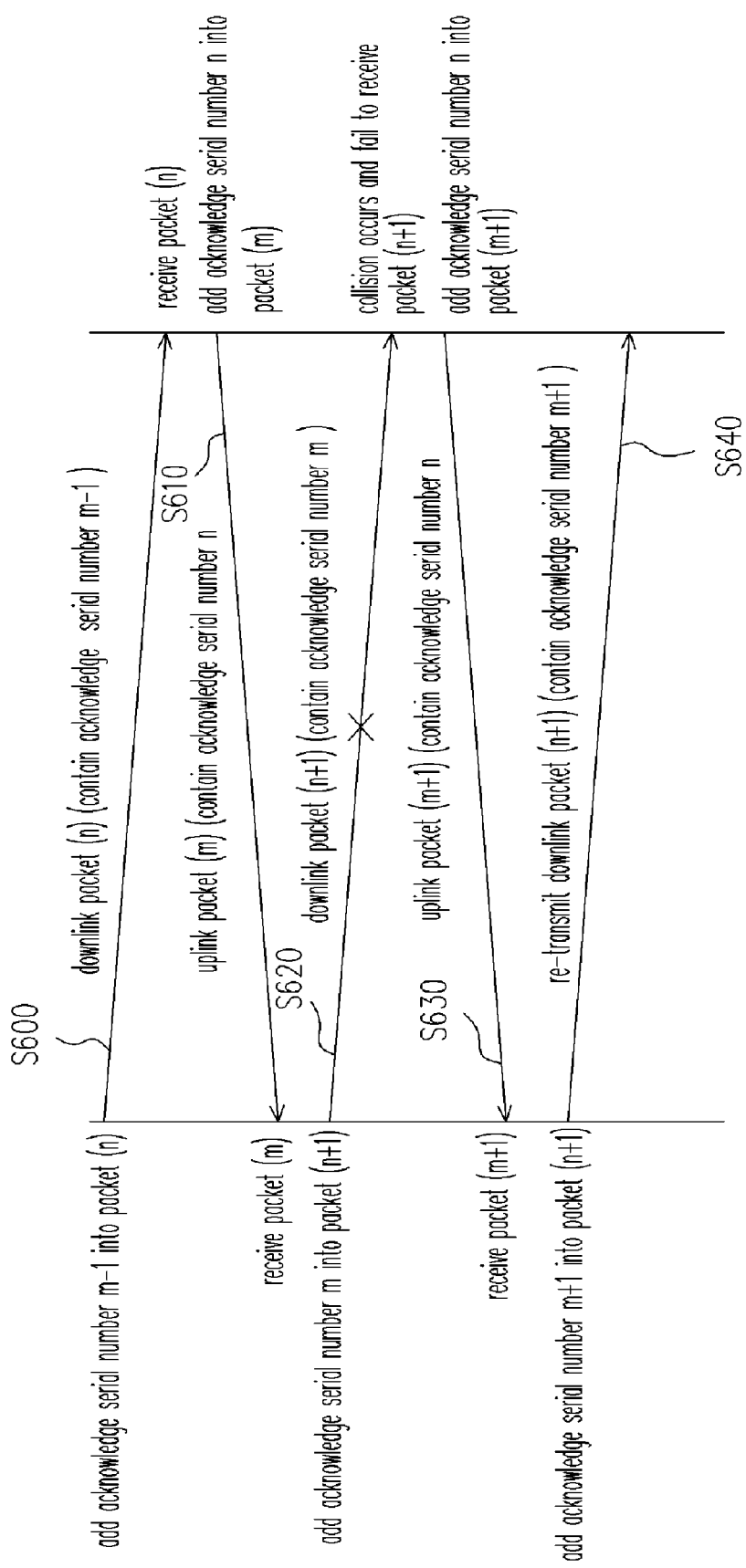
FIG. 6 is a flowchart illustrating the status variation of the multicast packet transmitting method of wireless network according to an embodiment of the present invention.

The technology of the present invention will be described with reference to FIG. 5 and FIG. 6. FIG. 6 is a flowchart illustrating the status variation of the multicast packet transmitting method of wireless network according to an embodiment of the present invention. To simplify the description, packet(k) is used to refer to the packet with serial number k.

As shown in FIG. 6, when the wireless network AP (the wireless network AP 500 in FIG. 5) transmits a downlink packet(n) to the MS (such as the MS 510 in FIG. 5), the wireless network AP 500 further allows the downlink packet (n) to carry a acknowledge serial number m−1 (step S600). Wherein, the acknowledge serial number m−1 may be the packet serial number of the uplink packet previously received from the MS 510, however, it may also be serial numbers otherwise defined.

If the MS 510 has successfully received the downlink packet (n), the MS 510 adds the serial number n as the acknowledgement serial number into the uplink packet(m) transmitted to the wireless network AP 500. Next, the packet (m) is sent to the wireless network AP 500 by the MS 510 (step S610).

When the wireless network AP 500 receives the uplink packet(m), it checks whether the acknowledgement serial number carried by the uplink packet(m) is the same as the packet serial number of the downlink packet previously transmitted. It means the previously transmitted downlink packet has been received by the MS 510 if the two serial numbers are identical, then the wireless network AP 500 transmits the next downlink packet(n+1), that is, the acknowledge serial number m is added into the packet(n+1) and the packet(n+1) is transmitted out (step S620).

In the present embodiment, if the MS 510 does not receive the packet(n+1) due to packet collision, external interference, or any other factors. Under such a situation, the packet serial number of the obtained nearest downlink packet is n when the MS 510 transmits packet (m+1), thus, the acknowledge serial number in packet (m+1) is n but not n+1 when the packet (m+1) is transmitted (step S630).

The wireless network AP 500 receives packet(m+1) from the MS 510 regardless of whether the previous downlink packet is collided. However, since the added checking serial number in the packet(m+1) is n but not the packet serial number of the previous downlink packet(n+1), the wireless network AP 500 accordingly determines that the packet(n+1) is not correctly received by the MS 510. Thus, the packet (n+1) is re-transmitted, but differs in that this time the checking serial number in the packet(n+1) is m+1 but not the previous checking serial number m (step S640).

As known by those skilled in the art, even though only the occurrence of collision situation of the downlink packet transmitted by the wireless network AP 500 is described in the embodiment described above, the same method can also be applied to the occurrence of collision situation of the uplink packet transmitted by the MS 510. Furthermore, the foregoing technology is still applicable even in such situation as continuous collision or unsymmetrical packet number. Continuous collision is processed in the way as described in the foregoing embodiment, and in the situation of unsymmetrical packet number, for example, one party (assuming the wireless network AP) finds out that the checking serial number in the received uplink packet is n−1 after it has transmitted downlink packet(n), downlink packet(n+1), and downlink packet (n+2), then the packets starting from or after packet(n) should be considered to be re-transmitted with appropriate scheduling.

Moreover, the present invention can be applied to the network environment wherein different communication channels are used for transmitting packets, and the present invention can also be applied to the network environment wherein the forward link and reverse link of the same communication medium are used for respectively transmitting uplink packets and downlink packets.

It should be noted that there are still many reserved fields in a packet according to present wireless network communication standard. Thus, the foregoing checking serial number in packet can be easily stored in a reserved field of the packet. For example, the reserved portion of the duration/ID field in a MAC (medium access control) header can be used for storing the checking serial number.

In addition to the piggyback ACK method described above, the present invention further provides a collision feedback technology for reducing the occurrence of packet collision.

Figure 7:
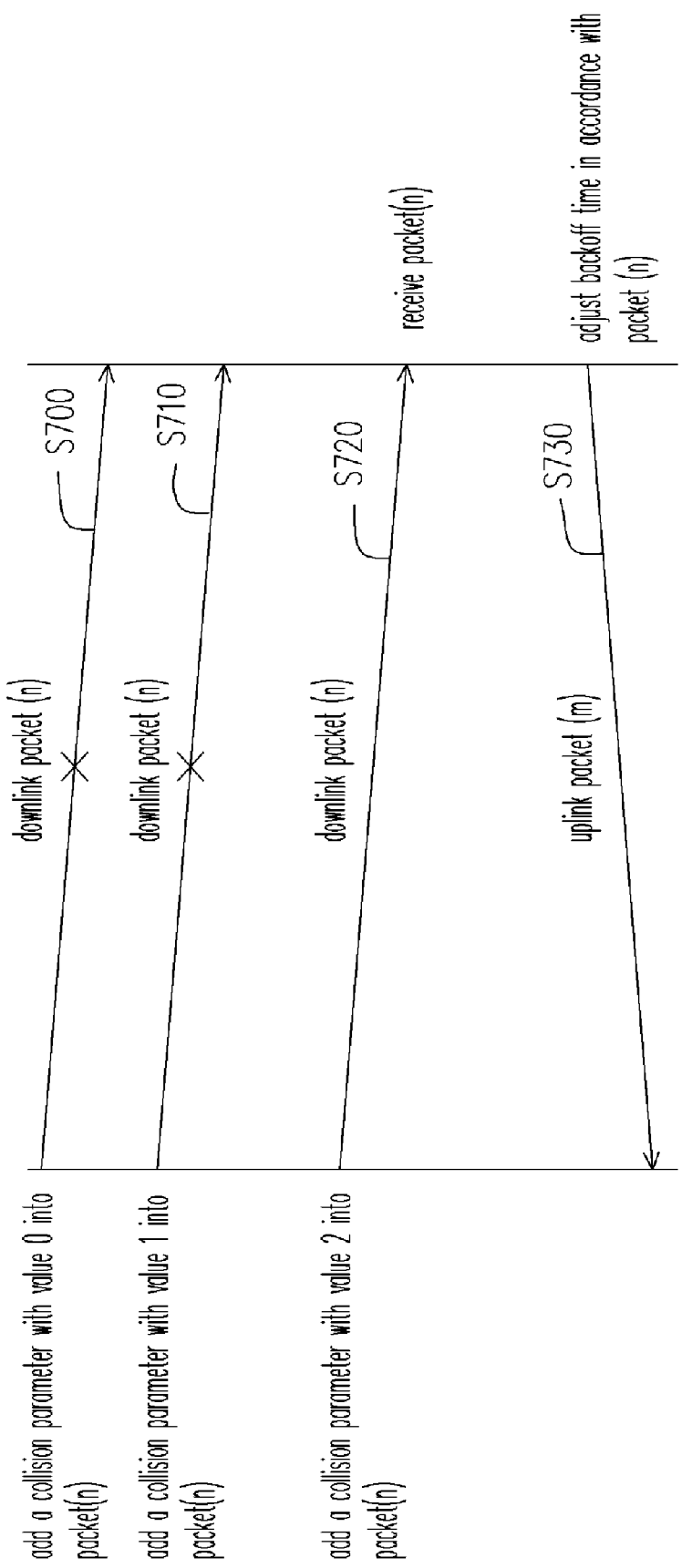
FIG. 7 is a flowchart illustrating the status variation of the multicast packet transmitting method of wireless network according to another embodiment of the present invention.

FIG. 7 is a flowchart illustrating the status variation of the multicast packet transmitting method of wireless network according to another embodiment of the present invention. In the present embodiment, the wireless network AP tries to transmit packets to the MS. At the beginning, a collision parameter with value 0 is added into packet(n) and the packet (n) is transmitted to the MS (step S700). If the MS does not receive this packet, the wireless network AP re-transmits the packet to the MS, however, the collision parameter of packet (n) is changed to 1 before the packet(n) is transmitted to the MS (step S710). If the MS still does not receive the re-transmitted packet, the wireless network AP tries to transmit the packet at the third time, and the collision parameter of the packet(n) is changed to 2 before the packet(n) is transmitted to the MS (step S720).

If the MS receives the packet(n) at the third transmission, here the backoff time used by the MS for transmitting an uplink packet to the wireless network AP is adjusted according to the collision parameter carried in the packet, and the uplink packet is transmitted according to the adjusted backoff time (step S730). In the present embodiment, since the collision parameter is increased due to the collisions of the packet, thus, the larger the collision parameter, the longer the backoff time. Through such adjustment, the receiving terminal (here it is the MS) can get to know the network situation from the experience obtained while the transmitting terminal (here it is the wireless network AP) transmits the packets, and the receiving terminal adjusts its backoff time accordingly to increase the probability of one-shot successful transmission, and further to save power consumed for re-transmitting packets.

It is noted that even though the receiving terminal and the transmitting terminal can keep setting the backoff time using the collision parameter obtained when the packet is successfully transmitted previously, there is another more flexible method wherein the receiving terminal or the transmitting terminal resets the collision parameter or the backoff time at a particular time interval or under a particular condition so as to increase the packet transmission speed.

Moreover, the adjustment of the collision parameter is achieved not only through a way of gradually increasing, but through such as gradually decreasing or a corresponding formula that is modified to be adapted for other situations by those with ordinary skill in the art.

In addition, as described above, there are still many reserved or unused fields in the packet according to present wireless network communication standard. Thus, the foregoing collision parameter in the packet can be stored in the packet easily. For example, the fragment number in the MAC header is not used in real-time audio communication because each segment of data is too short, thus, the data segment originally used for storing fragment number can be used for storing the collision parameter.

Figure 8:
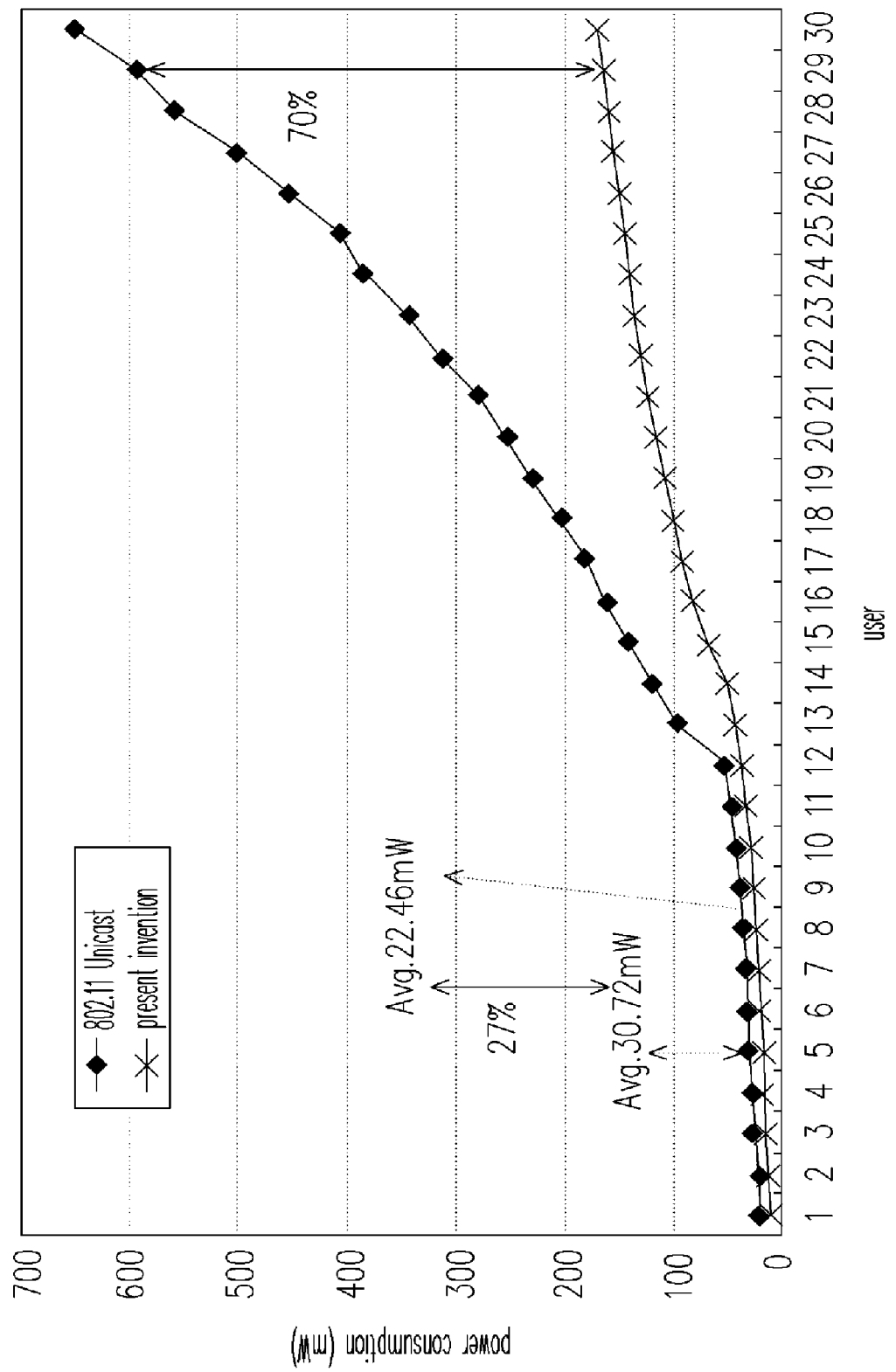
FIG. 8 is a curve diagram illustrating the power consumption of 802.11 unicast mode and the power consumption of an embodiment of the present invention when 1000 packets are transmitted successfully.

The difference in implementation performance between the present invention and the conventional technology will be described below. FIG. 8 is a curve diagram illustrating the power consumption of 802.11 unicast mode and the power consumption of an embodiment of the present invention when 1000 packets are transmitted successfully. As shown in FIG. 8, while there are less users (or MSs), the difference in the power consumption for transmitting 1000 packets between the present invention and the conventional technology is not obvious, but along with the increase of the number of users and the higher likelihood of packet collisions, the present invention can save over 70% of power.

Figure 9:
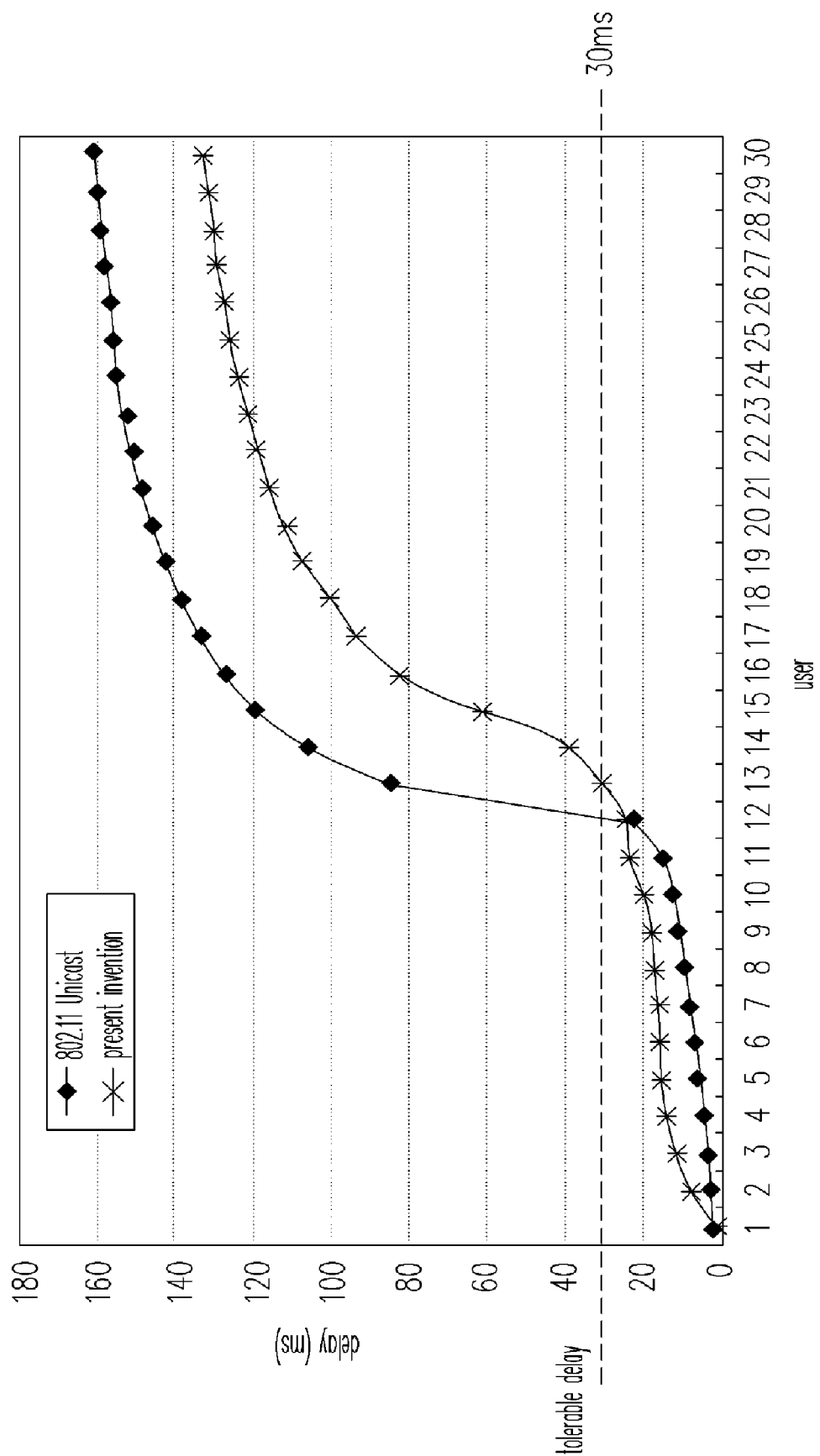
FIG. 9 is a curve diagram illustrating the transmission delay time of 802.11 unicast mode and an embodiment of the present invention.

FIG. 9 is a curve diagram illustrating the transmitting delay time of 802.11 unicast mode and an embodiment of the present invention. As shown in FIG. 9, in the present invention, the delay time can be maintained within a tolerable range (30 ms) of communication standard even though there may be longer delay time when there are fewer users. However, the present invention can effectively reduce delay time compared to the conventional technology when there are more users.

Figure 10:
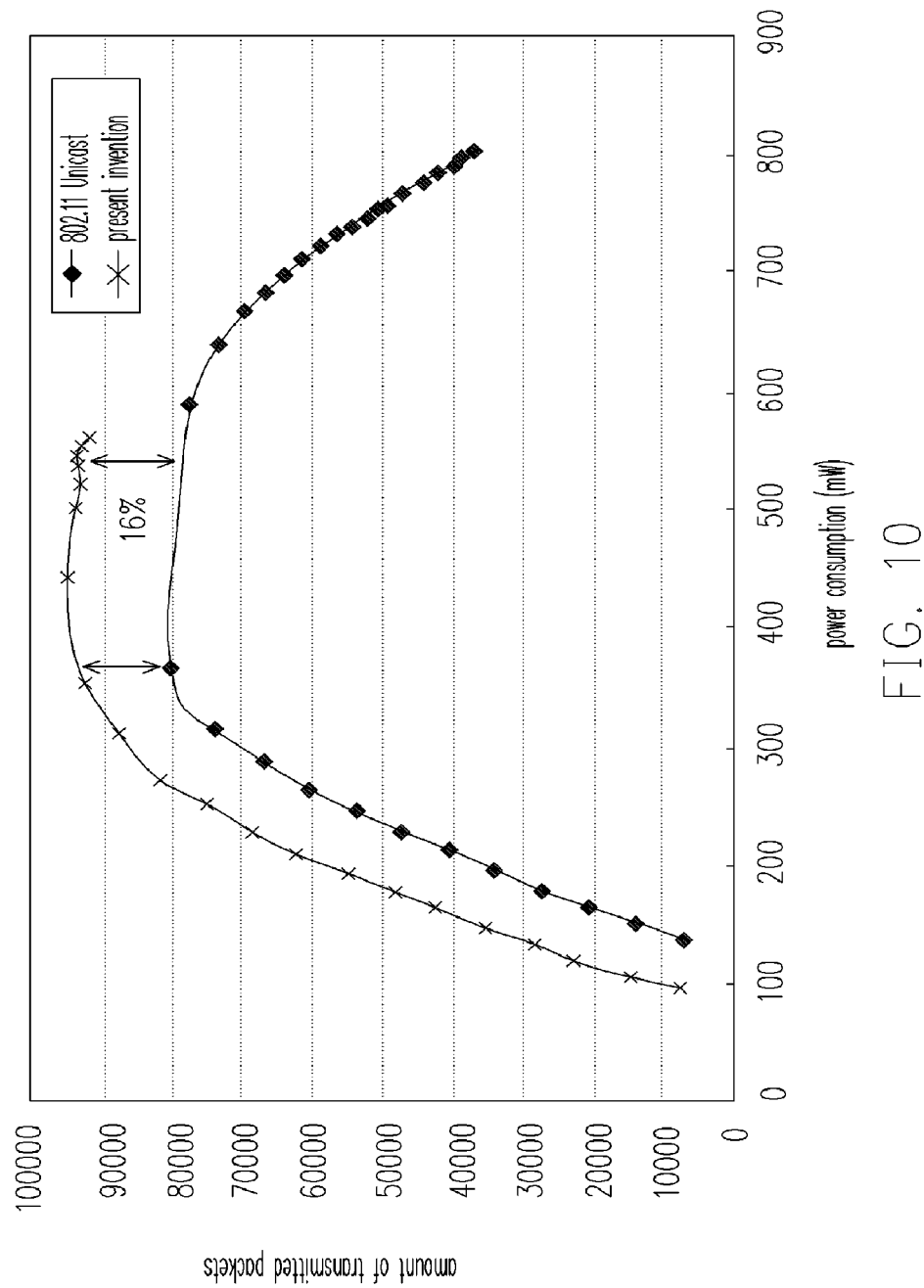
FIG. 10 is a curve diagram illustrating the system capacity-power consumption of 802.11 unicast mode and an embodiment of the present invention.

FIG. 10 is a curve diagram illustrating the system capacity-power consumption of 802.11 unicast mode and an embodiment of the present invention. As shown in FIG. 10, with the same power consumption, the packet number transmitted in the present invention is greater than that in the conventional technology. Moreover, when the network is crowded, re-transmitting packet has to be performed constantly due to packet collision in the conventional technology, so that the transmitted packet number is reduced even though the power consumption is increased. On contrary, such problem can be resolved by the present invention.

Figure 11:
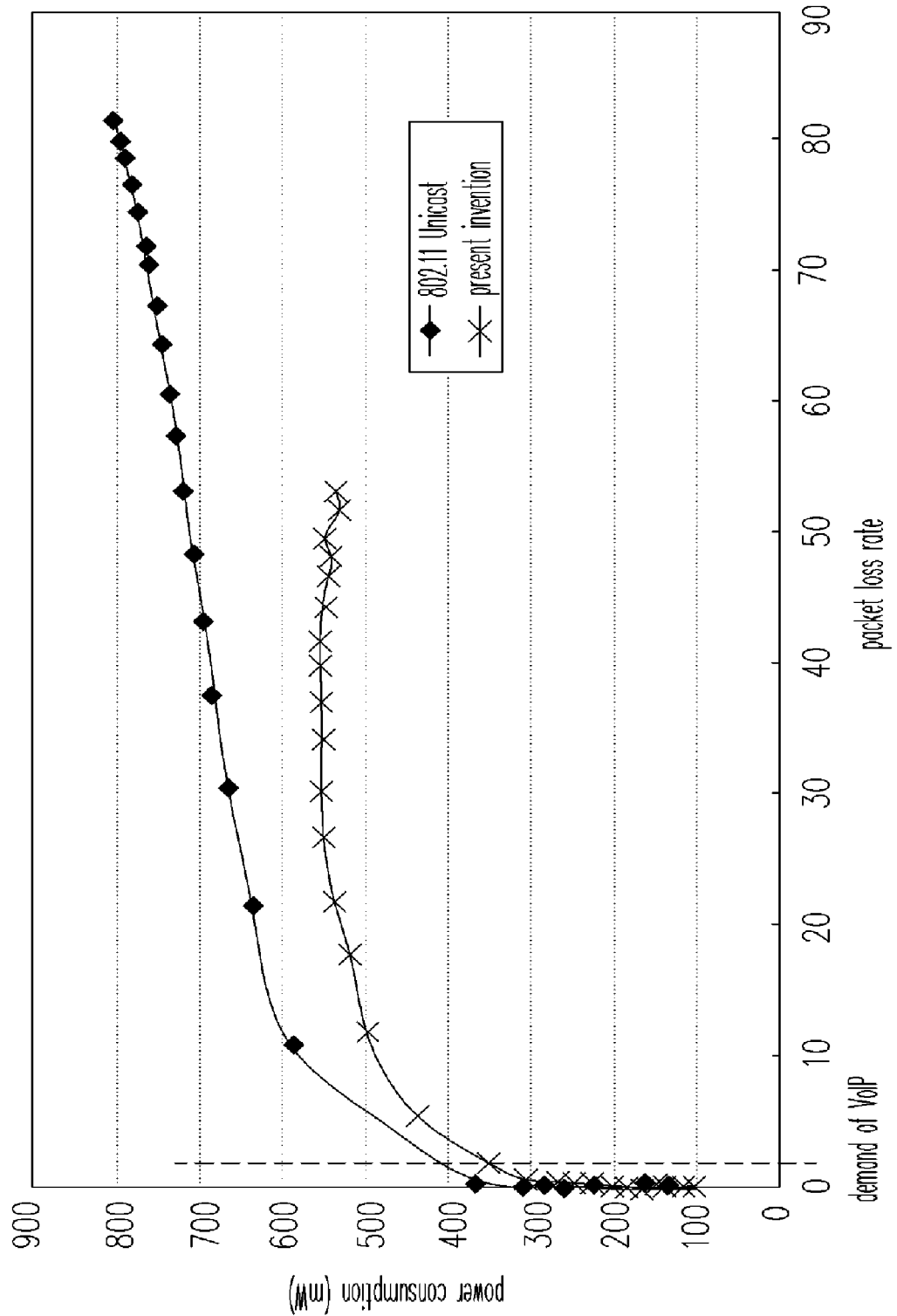
FIG. 11 is a curve diagram illustrating the packet loss rates of 802.11 unicast mode and an embodiment of the present invention.

FIG. 11 is a curve diagram illustrating the packet loss rates of 802.11 unicast mode and an embodiment of the present invention. As shown in FIG. 11, once there are more users, the packet loss rate will increase accordingly. According to the present invention, the packet loss rate can be reduced, and even at the same packet loss rate, the power consumption in the present invention is less than that of the conventional technology.

Figure 12:
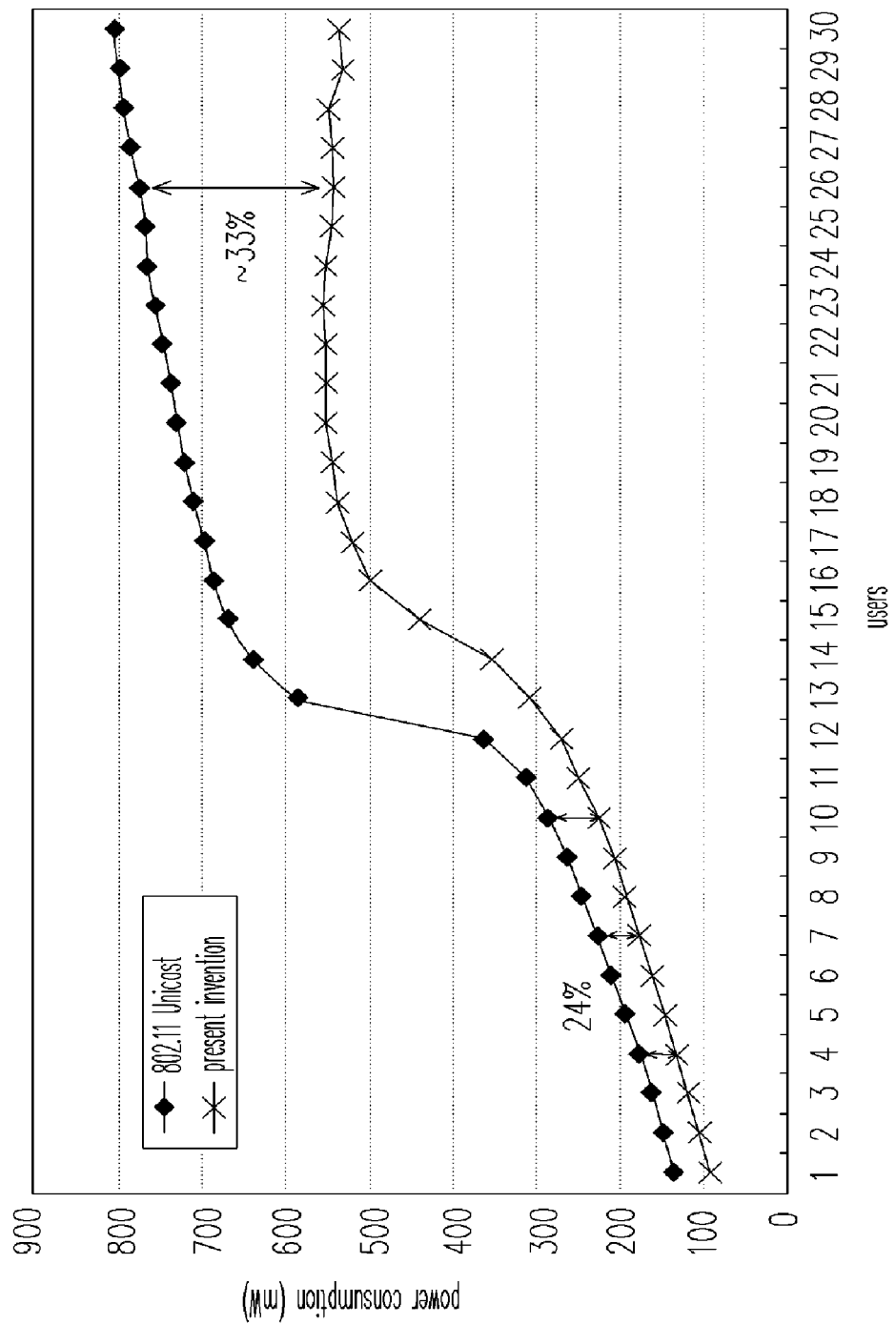
FIG. 12 is a curve diagram illustrating the whole power consumption of 802.11 unicast mode and an embodiment of the present invention.

FIG. 12 is a curve diagram illustrating the whole power consumption of 802.11 unicast mode and an embodiment of the present invention. Wherein, all the operational factors are considered in FIG. 12. During the initial period (less users), the piggyback ACK method is used to confirm a packet-transmission acknowledge, thus, the power consumption is 24% less than that of the original unicast mode. While during later period (more users), collision feedback method is used for reducing the power consumption required for re-transmitting packet, thus, the power consumption is about 33% less than that of the original unicast mode. Please note that because the power consumption here is considered along with the system capacity, thus, the comparison is not based on the same number of packets transmitted, instead, it is based on the maximum transmission capacity allowed by the system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A packet transmission method of wireless network, comprising:
  adding a first acknowledge serial number into a downlink packet by a first transmitting terminal;
  sending the downlink packet including the first acknowledge serial number to a second transmitting terminal by the first transmitting terminal; and
  determining whether to re-transmit the downlink packet by the first transmitting terminal according to a second acknowledge serial number in an uplink packet received from the second transmitting terminal after the first transmitting terminal outputs the downlink packet, wherein a packet serial number of the uplink packet received previously is used as the first acknowledge serial number every time before transmitting the downlink packet.

2. The packet transmission method as claimed in claim 1 further comprising:
  obtaining a packet serial number of the downlink packet as the second acknowledge serial number after the second transmitting terminal receives the downlink packet;
  putting the second acknowledge serial number into the uplink packet; and
  transmitting the uplink packet including the second acknowledge serial number by the second transmitting terminal.

3. The packet transmission method as claimed in claim 2, wherein if the second acknowledge serial number is different from the packet serial number of the previous downlink packet, the first transmitting terminal re-transmits the downlink packet whose packet serial number is next to the second acknowledge serial number.

4. The packet transmission method as claimed in claim 1, wherein the first acknowledge serial number and the second acknowledge serial number are respectively stored in MAC headers of the downlink packet and the uplink packet.

5. The packet transmission method as claimed in claim 4, wherein the first acknowledge serial number and the second acknowledge serial number are stored in duration/ID field of the MAC headers.

6. The packet transmission method as claimed in claim 1, wherein the first transmitting terminal transmits the downlink packet with a communication medium, and the second transmitting terminal transmits the uplink packet with a reverse link of the communication medium.

7. The packet transmission method as claimed in claim 1 further comprising:
- providing a collision count in the downlink packet when transmitting the downlink packet by the first transmitting terminal; and
- determining a backoff time of the subsequent uplink packet according to the collision count by the second transmitting terminal.

8. The packet transmission method as claimed in claim 7, wherein the collision count is determined according to collision count of the downlink packet.

9. The packet transmission method as claimed in claim 7 further comprising resetting the collision count after a predetermined time.

10. The packet transmission method as claimed in claim 7, wherein the collision count is stored in the MAC header of the downlink packet.

11. A packet transmission method of wireless network, comprising:
- adding a first acknowledge serial number into a downlink packet by a first transmitting terminal;
- sending the downlink packet including the first acknowledge serial number to a second transmitting terminal by the first transmitting terminal;
- determining whether to re-transmit the downlink packet by the first transmitting terminal according to a second acknowledge serial number in an uplink packet received from the second transmitting terminal after the first transmitting terminal outputs the downlink packet;
- providing a collision count in the downlink packet when transmitting the downlink packet by the first transmitting terminal; and
- determining a backoff time of the subsequent uplink packet according to the collision count by the second transmitting terminal,
- wherein the collision count is stored in a fragment number of the MAC header of the downlink packet.

12. The packet transmission method as claimed in claim 11 further comprising:
- obtaining a packet serial number of the downlink packet as the second acknowledge serial number after the second transmitting terminal receives the downlink packet;
- putting the second acknowledge serial number into the uplink packet; and
- transmitting the uplink packet including the second acknowledge serial number by the second transmitting terminal.

13. The packet transmission method as claimed in claim 12, wherein if the second acknowledge serial number is different from the packet serial number of the previous downlink packet, the first transmitting terminal re-transmits the downlink packet whose packet serial number is next to the second acknowledge serial number.

14. The packet transmission method as claimed in claim 11, wherein a packet serial number of the uplink packet received previously is used as the first acknowledge serial number every time before transmitting the downlink packet.

15. The packet transmission method as claimed in claim 11, wherein the first acknowledge serial number and the second acknowledge serial number are respectively stored in MAC headers of the downlink packet and the uplink packet.

16. The packet transmission method as claimed in claim 15, wherein the first acknowledge serial number and the second acknowledge serial number are stored in duration/ID field of the MAC headers.

17. The packet transmission transmitting method as claimed in claim 11, wherein the first transmitting terminal transmits the downlink packet with a communication medium, and the second transmitting terminal transmits the uplink packet with a reverse link of the communication medium.

18. The packet transmission method as claimed in claim 11, wherein the collision count is determined according to a collision number of the downlink packet.

19. The packet transmission method as claimed in claim 11 further comprising resetting the collision count after a predetermined time.

* * * * *